US009472370B2

(12) United States Patent
Perkins

(10) Patent No.: US 9,472,370 B2
(45) Date of Patent: Oct. 18, 2016

(54) NEUTRON GENERATOR HAVING MULTIPLE EXTRACTORS WITH INDEPENDENTLY SELECTABLE POTENTIALS

(71) Applicant: SCHLUMBERGER TECHNOLOGY CORPORATION, Sugar Land, TX (US)

(72) Inventor: Luke Perkins, Plainsboro, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 193 days.

(21) Appl. No.: 14/108,234

(22) Filed: Dec. 16, 2013

(65) Prior Publication Data

US 2015/0168590 A1 Jun. 18, 2015

(51) Int. Cl.

| | |
|---|---|
| ***G01V 5/04*** | (2006.01) |
| ***H01J 27/04*** | (2006.01) |
| ***H01J 27/02*** | (2006.01) |
| ***H05H 3/06*** | (2006.01) |

(52) U.S. Cl.
CPC .............. *H01J 27/04* (2013.01); *H01J 27/024* (2013.01); *H05H 3/06* (2013.01)

(58) Field of Classification Search
CPC .... H01J 2236/0807; H05H 6/00; H05H 5/00
See application file for complete search history.

(56) References Cited

U.S. PATENT DOCUMENTS

| | | | | |
|---|---|---|---|---|
| 6,907,097 | B2 * | 6/2005 | Leung | 376/108 |
| 2011/0044418 | A1 * | 2/2011 | Stubbers et al. | 376/116 |
| 2011/0114830 | A1 * | 5/2011 | Reijonen et al. | 250/251 |
| 2012/0326017 | A1 * | 12/2012 | Nikitin et al. | 250/269.7 |

* cited by examiner

*Primary Examiner* — David J Makiya
*Assistant Examiner* — Kenneth J Malkowski
(74) *Attorney, Agent, or Firm* — Michael Dae; David G. Matthews

(57) ABSTRACT

A radiation generator includes at least three extractor electrodes, with an ion source upstream of the at least three extractor electrodes to emit ions in a downstream direction toward the at least three extractor electrodes. There is a target downstream of the at least three extractor electrodes. The at least three extractor electrodes have independently selectable potentials so as to allow direction of an ion beam, formed from the ions, by the independently selectable potentials, toward different longitudinal and lateral regions of the target.

23 Claims, 12 Drawing Sheets

NEUTRON GENERATOR HAVING MULTIPLE EXTRACTORS WITH INDEPENDENTLY SELECTABLE POTENTIALS

FIELD OF THE DISCLOSURE

This disclosure relates to the field of radiation generators, and, more particularly, to radiation generators with ion beams that can be deflected in desired longitudinal and lateral directions.

BACKGROUND

Well logging instruments that utilize radiation generators, such as sealed-tube neutron generators, have proven incredibly useful in oil formation evaluation. Such a neutron generator may include an ion source or ionizer and a target. An electric field, which is applied within the neutron tube, accelerates ions generated by the ion source as an ion beam toward an appropriate target at a speed sufficient such that, when the ions are stopped by the target, fusion neutrons are generated and irradiate the formation into which the neutron generator is placed. The neutrons interact with elements in the formation, and those interactions can be detected and analyzed in order to determine characteristics of interest about the formation.

Traditional neutron generators tightly focus the ion beam to help reduce a number of undesirable effects that can shorten their lifetime. However, a tightly focused ion beam may cause the formation of an area or hole in the target depleted in the reactants used for producing fusion neutrons. This can lower the neutron output of the neutron generator, or even lead to failure of the neutron generator.

Another type of radiation generator is an x-ray generator, and includes an electron source and a target. An electric field applied in the x-ray tube accelerates electrons emitted by the electron source as an electron beam toward the target at a speed sufficient such that, when the electrons are stopped by the target, Bremsstrahlung x-rays are released.

Traditional x-ray generators tightly focus their electron beams, which can cause a hole to be burned in the target. This can lower the x-ray output of the x-ray generator, or even lead to failure.

Thus, radiation generators capable of mitigating these undesirable effects of tightly focused beams are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with the present disclosure, a radiation generator may include at least three extractor electrodes, and an ion source upstream of the at least three extractor electrodes to emit ions in a downstream direction toward the at least three extractor electrodes. In addition, a target may be downstream of the at least three extractor electrodes. The at least three extractor electrodes may have independently selectable potentials so as to allow direction of an ion beam, formed from the ions by the three independently selectable potentials, toward different longitudinal and lateral regions of the target.

Another aspect is directed to a well logging tool for determining at least one property of a subsurface formation. The well logging tool may include a radiation generator. The radiation generator may include at least three extractor electrodes, and an ion source upstream of the at least three extractor electrodes to emit ions in a downstream direction toward the at least three extractor electrodes. In addition, a target may be downstream of the at least three extractor electrodes. The at least three extractor electrodes may have independently selectable potentials so as to allow direction of an ion beam, formed from the ions by the independently selectable potentials, toward different longitudinal and lateral regions of the target. The well logging tool may also include at least one radiation detector to detect incoming radiation resulting from interactions between the outgoing radiation and the subsurface formation, and processing circuitry coupled to the at least one radiation detector to determine the at least one property of the subsurface formation based upon the detected incoming radiation.

A method aspect is directed to a method of operating a radiation generator that may include emitting ions from an ion source in a downstream direction toward at least three extractor electrodes. The method may also include selecting potentials of the at least three extractor electrodes so as to direct of an ion beam, formed from the ions by the selected potentials, toward different longitudinal and lateral regions of a target downstream of the at least three extractor electrodes.

DETAILED DESCRIPTION

Figure 1:
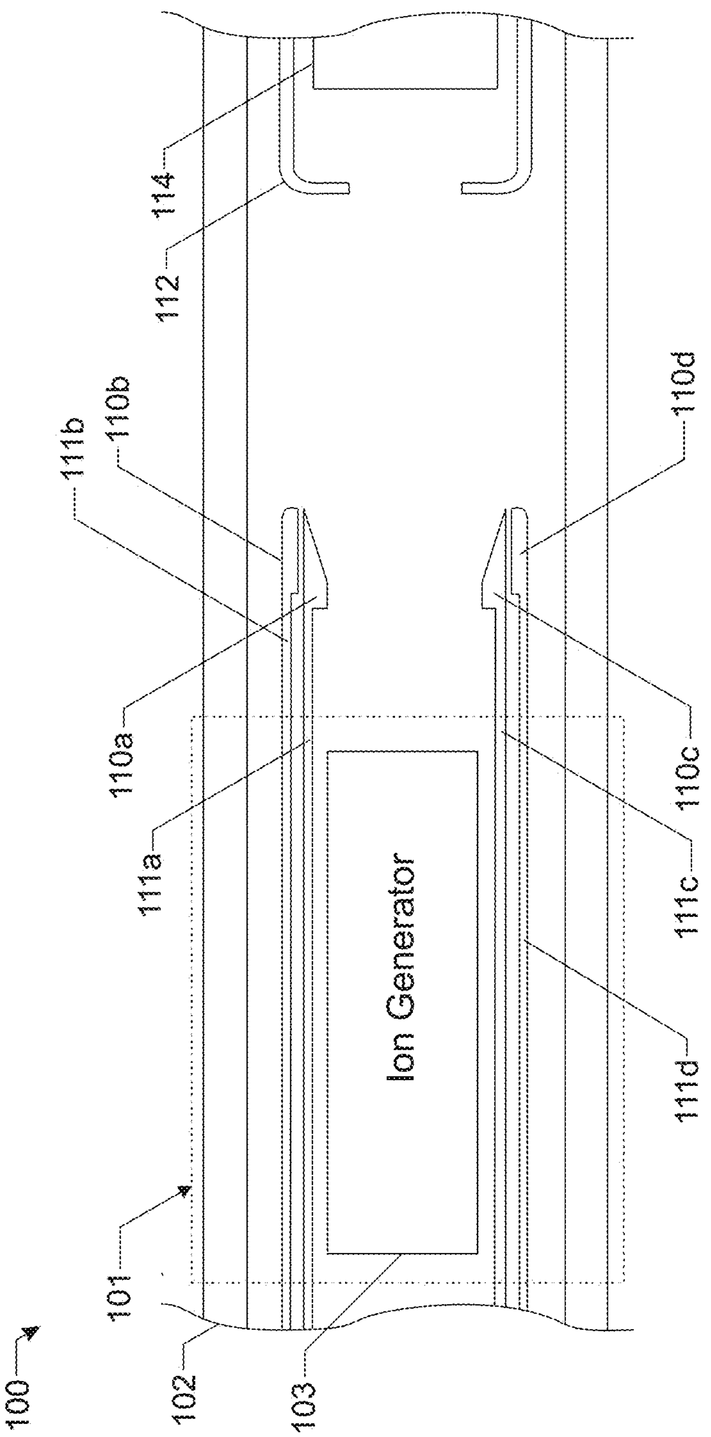
FIG. 1 is a schematic cross sectional view of a radiation generator in accordance with the present disclosure, wherein multiple axially collocated extractor electrodes are supported by axial feedthroughs in a housing of the radiation generator.

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art having the benefit of this disclosure. In the drawings, like numbers separated by century denote similar components in other configurations, although this does not apply to FIG. 9.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

For clarity in descriptions, when the term "downstream" is used, a direction toward the target of a radiation generator tube is meant, and when the term "upstream" is used, a direction away from the target of a radiation generator tube is meant. "Interior" is used to denote a component carried within the sealed envelope or housing of a radiation generator tube, while "exterior" is used to denote a component carried outside of the sealed envelope of a radiation generator tube. An "active" cathode is used to describe a cathode which is designed to emit electrons, as opposed to a "passive" cathode, which is an electrode of negative potential relative to the ion source.

In addition, when any voltage or potential is referred to, it is to be understood that the voltage or potential is with respect to a reference voltage, which may or may not be ground. The reference voltage may be the voltage of the active cathode as described below, for example. Thus, when a "positive" voltage or potential is referred to, that means positive with respect to a reference voltage, and when a "negative" voltage of potential is referred to, that means negative with respect to a reference voltage.

Referring initially to FIG. 1, a radiation generator 100 is now described. The radiation generator 100 includes an ion source 101. The ion source 101 includes a portion of a hermetically sealed envelope or housing, with one or more insulator(s) 102 forming a part of the hermetically sealed envelope or housing. The insulator 102 may be an insulator constructed from ceramic material, such as $Al_2O_3$. At least one ionizable gas, such as hydrogen, deuterium, or tritium, is contained within the hermetically sealed envelope at a pressure of 1 mTorr to 20 mTorr, for example. A gas reservoir (not shown), such as a getter, stores and supplies this gas and can be used to adjust this gas pressure. It should be understood that the gas reservoir may be located anywhere in the ion source 101 since the hermetically sealed envelope helps to prevent gas loss, and in some cases, may be positioned outside of the ion source 101. The ion source 101 includes an ion generator 103 which generates positive deuterium and/or tritium ions, and emits them in a downstream direction.

Figure 2:
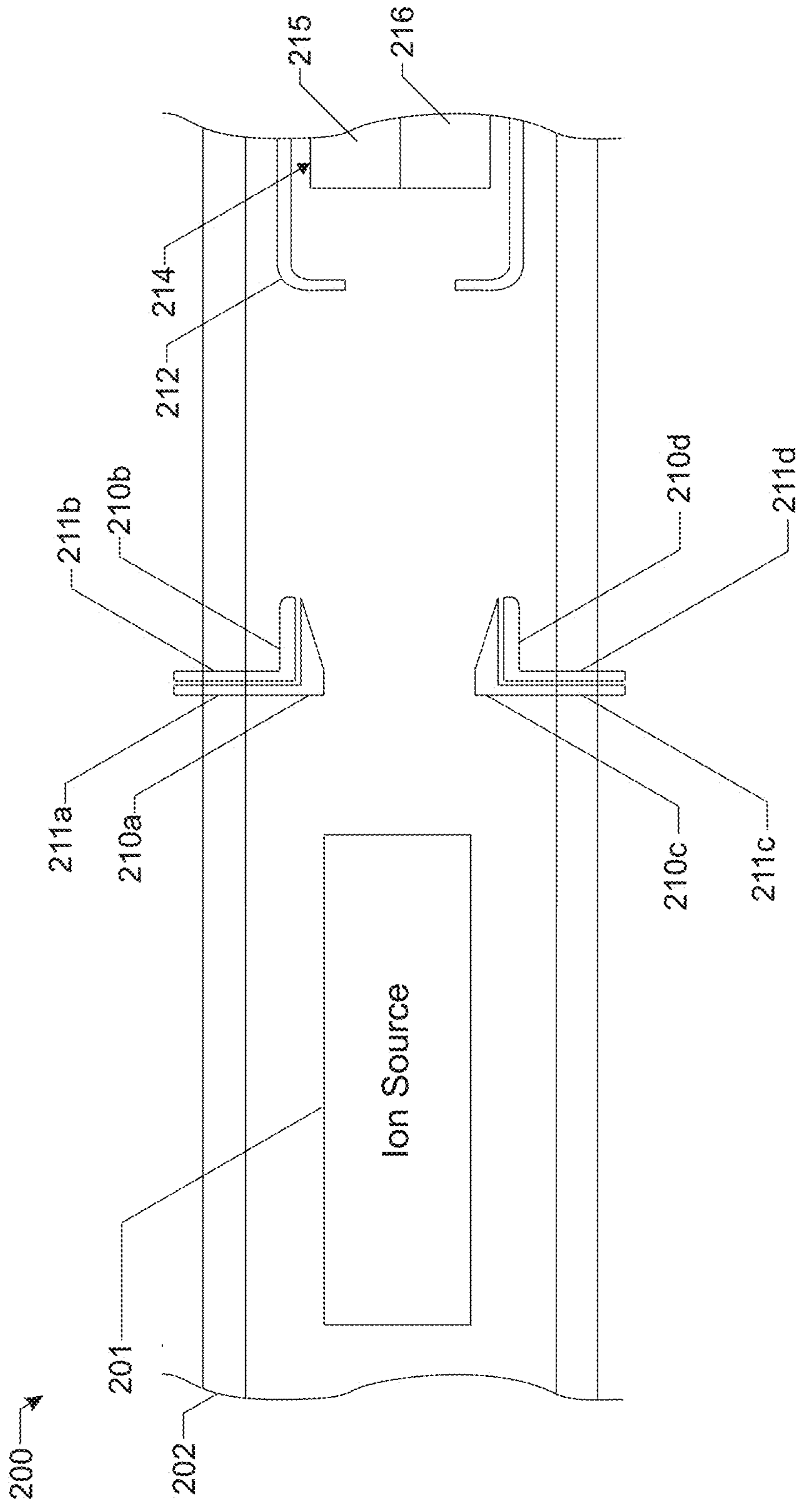
FIG. 2 is a schematic cross sectional view of a radiation generator in accordance with the present disclosure, wherein multiple axially collocated extractor electrodes are supported by radial feedthroughs in the housing.

Downstream of the ion generator 103 are four extractor electrodes or extractor electrode segments 110*a*-110*d*, although it should be understood that there may be more or less than four such segments (i.e., there may be two extractor electrode segments, three extractor electrode segments, four extractor electrode segments, five extractor electrode segments, six extractor electrode segments, etc.). Respective support structures 111*a*-111*d* extend axially through feedthroughs or vias (not shown) in the insulator 102 to carry (i.e., physically support and electrically couple to their respective voltage sources or feeds) the extractor electrode segments 110*a*-100*d*. Other configurations may be used as well. For example, as shown in FIG. 2, the support structures 211*a*-211*d* may extend radially through feedthroughs or vias in the insulator 202 to carry the extractor electrode segments 210*a*-210*d*.

Figure 3:
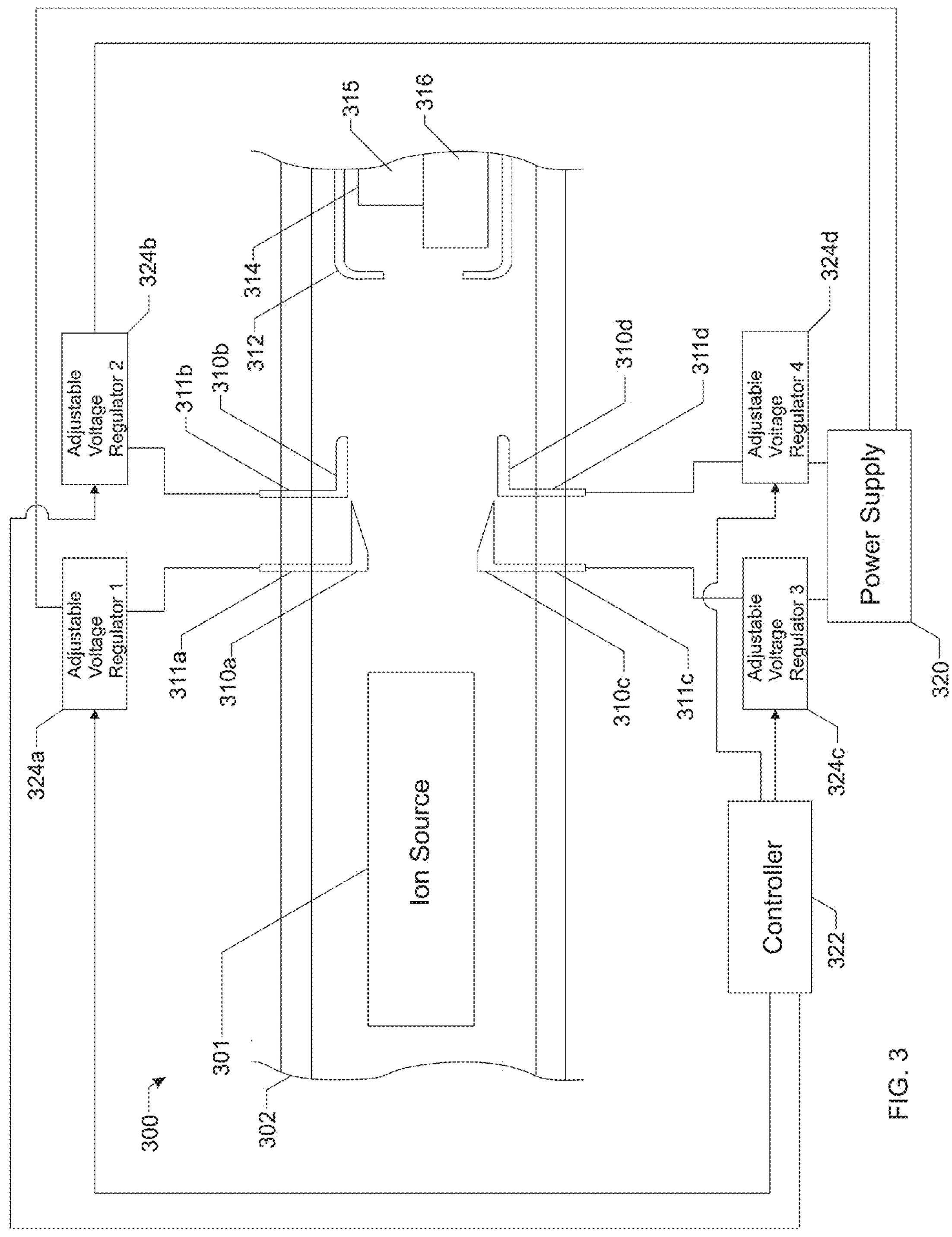
FIG. 3 is a schematic cross sectional view of a radiation generator in accordance with the present disclosure, wherein multiple axially spaced apart extractor electrodes are supported by radial feedthroughs in the housing, and wherein associated power and control circuitry is schematically shown.
Figure 8:
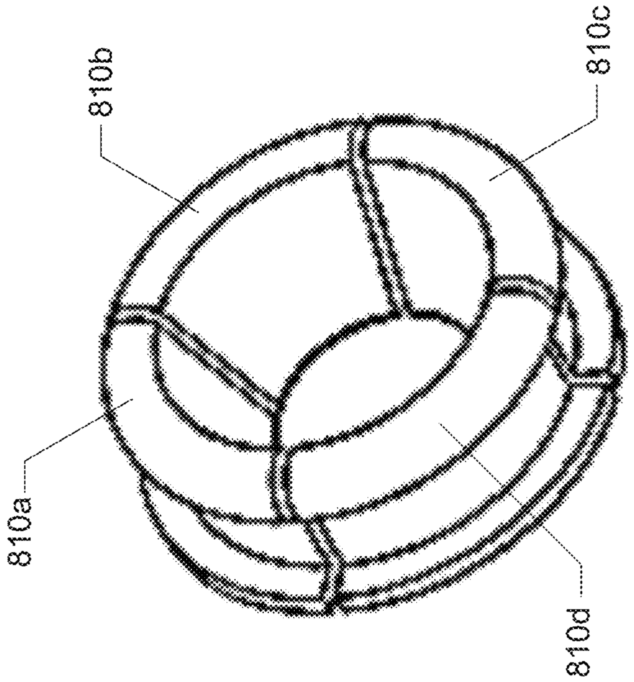
FIG. 8 shows four axially collocated extractor electrodes that may be used with the radiation generators of this disclosure.

The extractor electrode segments 210*a*-210*d* may be axially collocated, or may be axially spaced apart as shown by the extractor electrode segments 310*a*-310*d* in FIG. 3. Likewise, the support structures 311*a*-311*d* may be axially spaced apart as shown in FIG. 3, or may be axially collocated as shown by the support structures 111*a*-111*d* in FIG. 1. Axial collocation of the extractor electrode segments 110*a*-110*d* of FIG. 1 may be more mechanically complex to accomplish than the axially spaced extractor electrode segments 310*a*-310*d* of FIG. 3, but helps to reduce the overall length of the radiation generator 100, which may be desirable. An example of one configuration of the extractor electrode segments 810*a*-810*d* being axially collocated is shown in FIG. 8.

Referring again to FIG. 1, the potentials of the extractor electrode segments 110*a*-100*d* help to define and shape the electric field within the ion source 101, and to accelerate the ions out of the ion source 101 as an ion beam directed downstream toward and through suppressor electrode 112, and onto a target 114. The ions are further accelerated as they travel downstream by the voltage differences between the extractor electrode segments 110*a*-110*d* and the suppressor electrode 112 as well as the target 114. When the ions of the ion beam strike isotopes embedded in the target 114, fusion reactions such as deuterium-deuterium (d-D), deuterium-tritium (d-T), and tritium-tritium (t-T) reactions, may occur, depending upon what types of ions are contained in the ion beam, and depending upon what types of ions are embedded within the target 114. A byproduct of these fusion reactions is the creation of neutrons, with a d-D fusion reaction creating a 2.45 MeV neutron, a d-T fusion reaction creating a 14.1 MeV neutron, and a t-T fusion creating a pair of neutrons of an undefined energy (but less than 11.3 MeV combined between the pair).

The potential of each extractor electrode segment 110*a*-100*d* is separately selectable. For example, the extractor electrode segment 110*a* may be a first potential, while the extractor electrode segment 110*b* is at a second potential different than the first potential. By having unequal potentials between certain (or between each) extractor electrode segments 110*a*-100*d*, a voltage difference between certain (or between each) extractor electrode segment is created, and thus electric fields with a component orthogonal to the direction of the charged particle beam can be formed. This enables deflection or "steering" of the charged particle beam using electrostatic forces as desired. Thus, by selecting or setting the potentials of the extractor electrode segments 110*a*-100*d*, the point of impact between the ion beam and the target 114 can be changed both longitudinally and laterally.

By being able to select the point of impact between the ion beam and the target 114, heat loading on the target 114 can be managed, depletion of embedded isotopes- in the target can be managed, the lifespan of the radiation generator 100 can be increased, and other desirable results as will be described below may also be accomplished.

Referring again to FIG. 2, in some applications, the target 214 can comprises a plurality of different target areas 215, 216. Although two different target areas 215, 216 are shown, it should be appreciated that there can be any number of such target areas. These different target areas 215, 216 may each have a different coating thereon, such as different metal hydride coatings that perform differently at different temperatures. Thus, these coatings can be selected so as to maintain an optimum neutron output at different operating temperatures of the radiation generator 100. For example, the target area 215 may have a titanium coating, while the target area 216 may have a scandium coating. It is known to those skilled in the art that, as a metal hydride, titanium has a much lower desorption temperature than scandium. As a result, at temperature nearing the desorption temperature of titanium, scandium will retain a greater concentration of hydrogen isotopes, and hence be capable of producing more neutrons for a given reactant ion beam current.

Referring now to FIG. 3, in some applications, the target 314 can comprise a plurality of longitudinally spaced apart target portions 315, 316. This allows selection of different longitudinal points of neutron emission. Although the longitudinally spaced apart target portions 315, 316 portions are shown as being part of a same target 314, they may not be, and instead, they can be spaced apart longitudinally without being physically connected to each other. The longitudinally spaced apart target portions 315, 316 may be electrically coupled in some applications.

Example circuitry such as may be used to control the independently selectable potentials of the extractor electrode segments 310*a*-310*d* is now described. Each extractor electrode 310*a*-310*d* is coupled to a power supply 320 via a respective adjustable voltage regulator 324*a*-324*d*. A controller 322 is coupled to the adjustable voltage regulators 324*a*-324*d* to control them, and thus, can adjust the potentials of each extractor electrode segment 310*a*-310*d* separately.

The controller 322 can be programmed to control the extractor electrode segments 310*a*-310*d* in a variety of ways. For example, the controller 322 can control the potentials of the extractor electrode segments 310*a*-310*d* so as to direct the ion beam toward the different target areas 315, 316, and toward different subareas of the different target areas, to reduce the heat load on the target 314. This can help extend the life of the radiation generator 300. This may be done based upon the operating temperature of the radiation generator 300, or based upon a condition of the target 314. The condition of the target 314 can include the temperature of the target, and/or an amount of—erosion in the target, and/or a number of neutrons emitted from the target in a given period of time. The controller 322 may also control the potentials of the extractor electrode segments 310*a*-310*d* so as to sweep the ion beam across the target 314 in a pattern designed to perform a certain function, for example to evenly distribute heat loading or wear patterning of the target.

The ion source 301 may be any form of ion source as will be appreciated by those skilled in the art. For example, the ion source 301 may be of a type employing an active cathode that accelerates electrons through ionizable gas to create ions, a type that ionizes gas through quantum tunneling of electrons from nanotips to gas molecules, a penning style ion generator, or a microwave or RF ion generator, for example.

Figure 4:
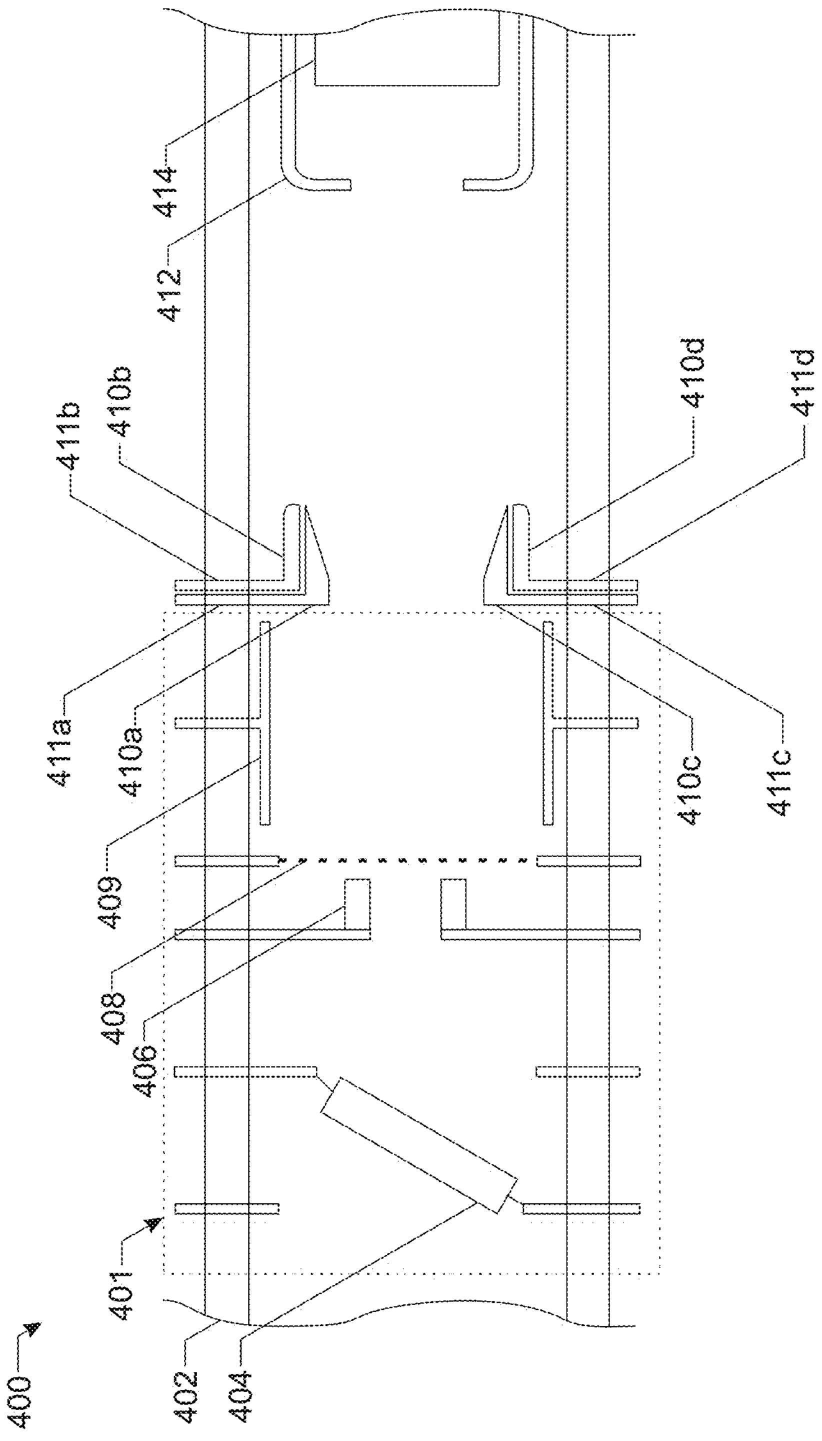
FIG. 4 is a version of the radiation generator of FIG. 2, wherein the ion source includes an ohmically heated cathode.

An example where the ion source 301 includes an active cathode is now described with reference to FIG. 4. Here, there is a gas reservoir 404 within the sealed envelope 402, with an ohmically heated cathode 406 downstream of the gas reservoir (although it should be noted that the gas reservoir 404 can be located anywhere within the radiation generator 400). The ohmically heated cathode 406 emits electrons via thermionic emission. A cathode grid (or passive electrode having an aperture therein) 408 is downstream of the ohmically heated cathode 406. A voltage difference between the ohmically heated cathode 406 and the cathode grid 408 accelerates the electrons away from the ohmically heated cathode in a downstream direction. An (optional) cylindrical electrode 409 is downstream of the cathode grid and helps to define the electric field in the ion source 401. The extractor segments 410*a*-410*d* are downstream of the cylindrical electrode 410.

Figure 5:
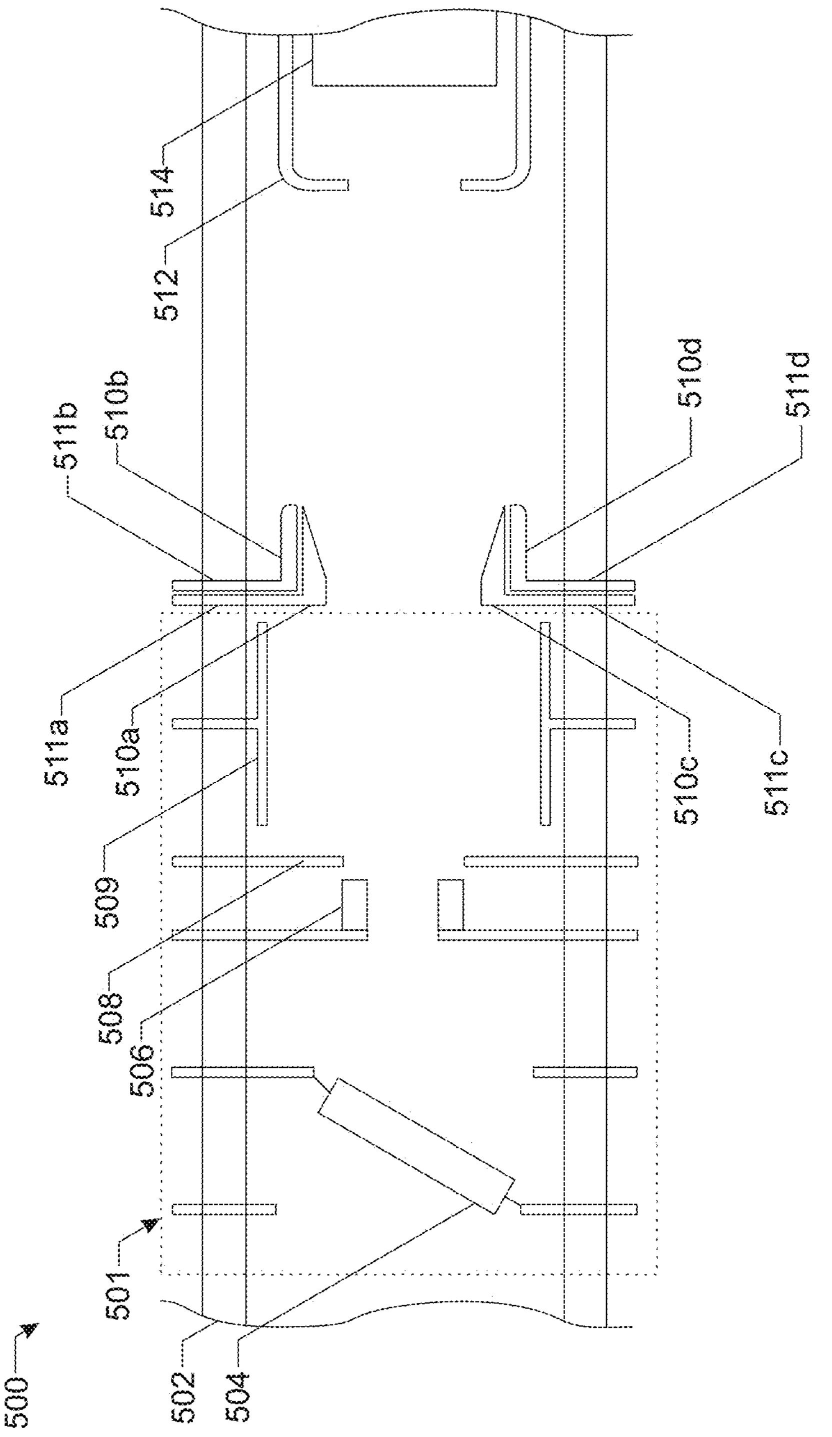
FIG. 5 is a version of the radiation generator of FIG. 2, wherein the ion source includes a field emitter array (FEA) cathode.

Another example where the ion source 401 includes a different type of active cathode is now described with reference to FIG. 5. Here, the ion source 501 is similar to the ion source 401 described above with reference to FIG. 4, but instead of an ohmically heated cathode contains a field emitter array (FEA) cathode 506 downstream of the gas reservoir 504. The FEA cathode 506 can be a Spindt cathode, or instead may be a plurality of nanotips extending from a substrate or grid. If the FEA cathode 506 is a Spindt cathode, it emits electrons on its own (when internally biased properly), and the anode 508 downstream of the FEA cathode is optional, although still helpful in accelerating the electrons in a downstream direction due to the voltage difference between the anode and the FEA cathode. If the FEA cathode 506 is not a Spindt cathode, electrons are emitted from the FEA cathode due to the voltage difference between the FEA cathode and the anode 508. The other portions of the ion source 501 are similar to those described above and need no further description.

Figure 6:
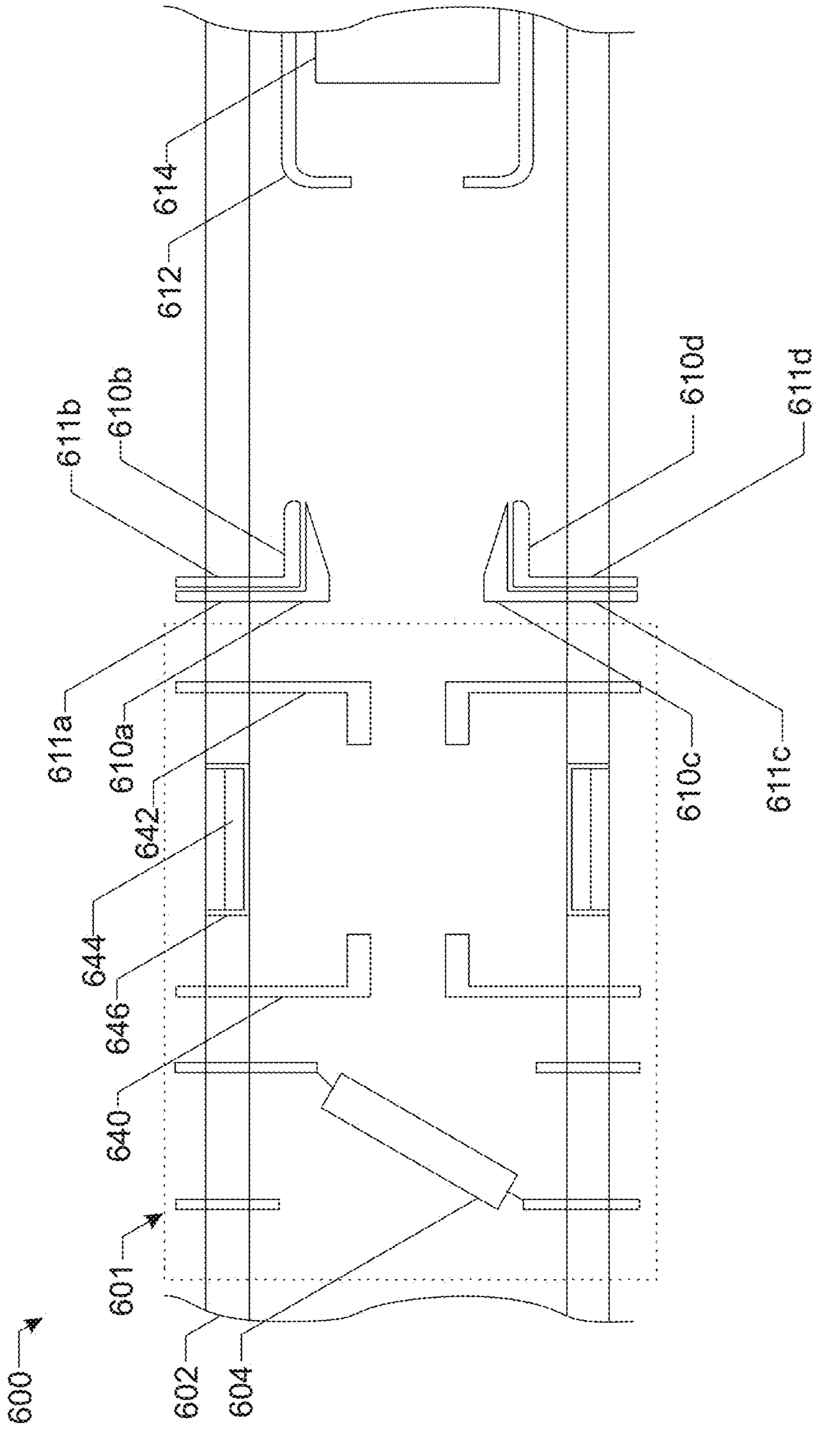
FIG. 6 is a version of the radiation generator of FIG. 2, wherein the ion source is a penning type ion source.

Turning now to the radiation generator 600 of FIG. 6, a penning type ion source 601 is employed. The penning type ion source 601 includes a back passive cathode electrode 640, with a passive cylindrical anode electrode 646 downstream therefrom. A magnet 644 (permanent or electromagnet) is axially collocated with the passive cylindrical anode electrode 646, and a front passive cathode electrode 642 is downstream of the passive cylindrical anode electrode. The extractor electrode segments 610*a*-610*d* are downstream of the front passive cathode electrode 62.

There is a large voltage difference between the back passive cathode electrode 640 and the passive cylindrical anode electrode 646, as well as between the front passive cathode electrode 642 and the passive cylindrical anode electrode. This voltage difference is sufficient such that an electrical discharge between the back passive cathode electrode 640 and the passive cylindrical anode electrode 646, and/or the front passive cathode electrode 642 and the passive cylindrical anode electrode, occurs.

Due to the voltage difference between the back passive cathode electrode 640 and the passive cylindrical anode electrode 646, and between the passive cylindrical anode electrode and the front passive cathode electrode 642, an electrostatic well is created between the back passive cathode electrode and the front passive cathode electrode. The electrostatic well electrically confines charged particles such that they remain between the back passive cathode electrode and front passive cathode electrode.

The charged particles as they travel from the back passive cathode electrode 640 to the front passive cathode electrode 642 are attracted toward the passive cylindrical anode electrode 646. However, the magnet 644 generates a magnetic field pointing mostly downstream, such that the charged particles are prevented from traveling directly to the anode electrode, and instead are confined to orbits about lines of the magnetic field, travelling back and forth in the electrostatic potential well created by this Penning anode-cathode configuration. Thus, rather than following a relatively straight trajectory as they travel, the charged particles travel along a spiral or helical shaped trajectory, thereby greatly increasing the length of the path they follow. This increases the chances for ionization for the electrons present in the ionization region.

Figure 7:
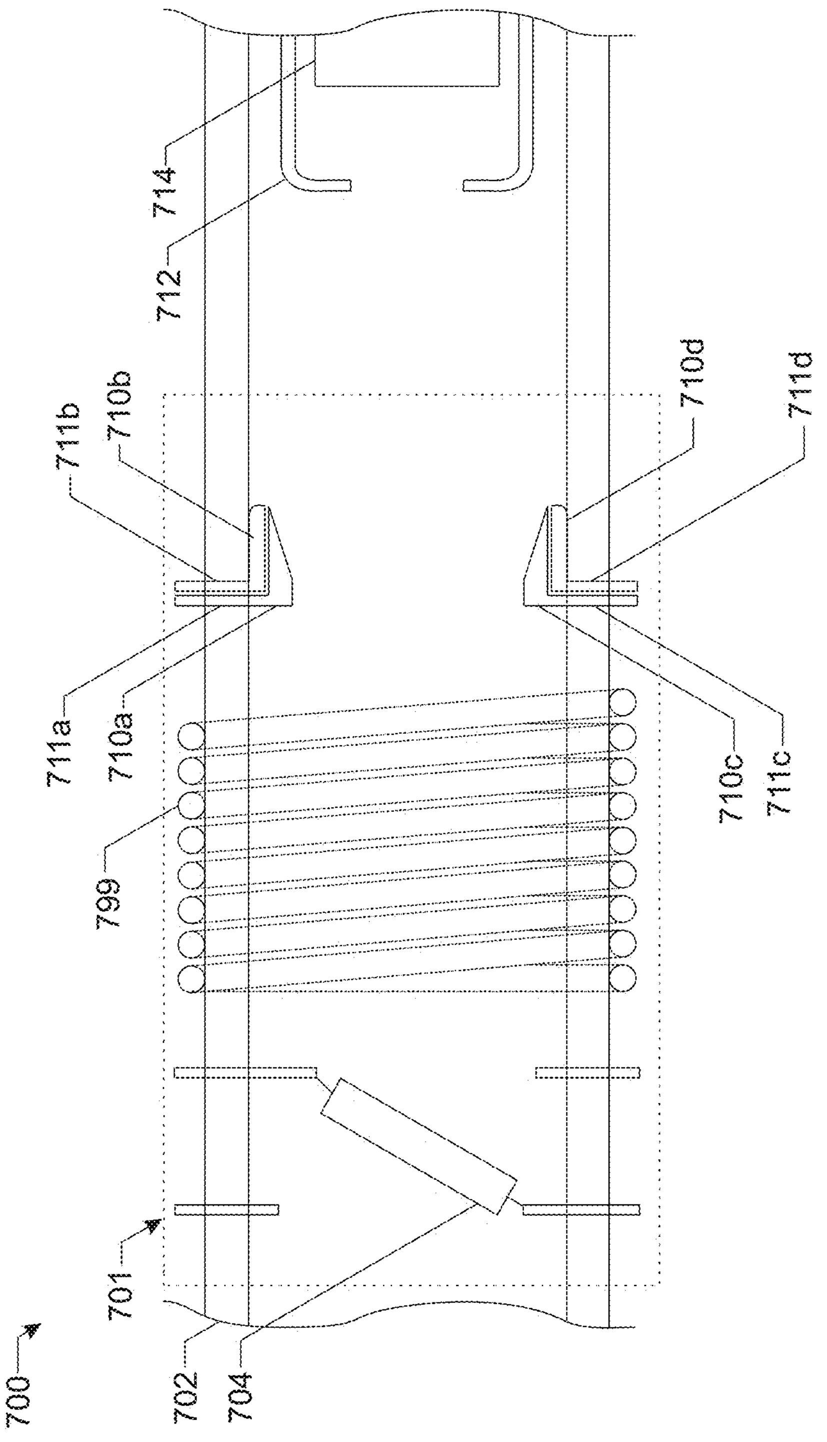
FIG. 7 is a version of the radiation generator of FIG. 2, wherein the ion source is a RF ion source.

Moving along to the radiation generator 700 of FIG. 7, a RF or microwave ion source 701 is employed. Here, a series of electrically conductive coils 799 are wrapped around the dielectric/electrical insulator 702. The extractor electrode segments 710*a*-710*d* are downstream of the series of electrically conductive coils 799. During operation, the series of electrically conductive coils 799 cause radiofrequency energy to permeate and/or penetrate the insulator, and to ionize some of the ionizable gas contained in the envelope in proximity to the coil. Other configurations of coils or RF/Microwave generators are also applicable, as will be understood by those of skill in the art.

Figure 10:
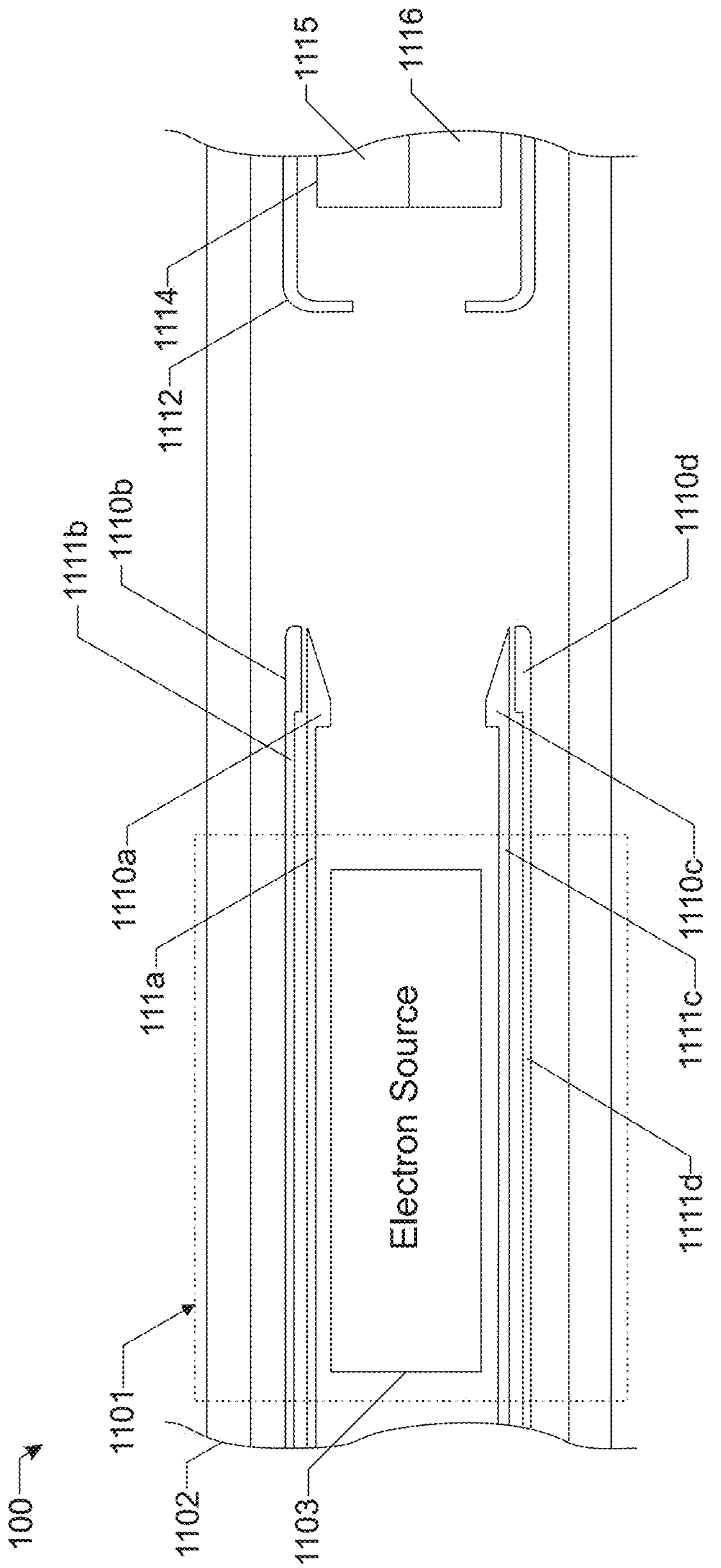
FIG. 10 is a schematic cross sectional view of a radiation generator in accordance with the present disclosure, wherein multiple axially collocated extractor electrodes are supported by axial feedthroughs in a housing of the radiation generator.
Figure 11:
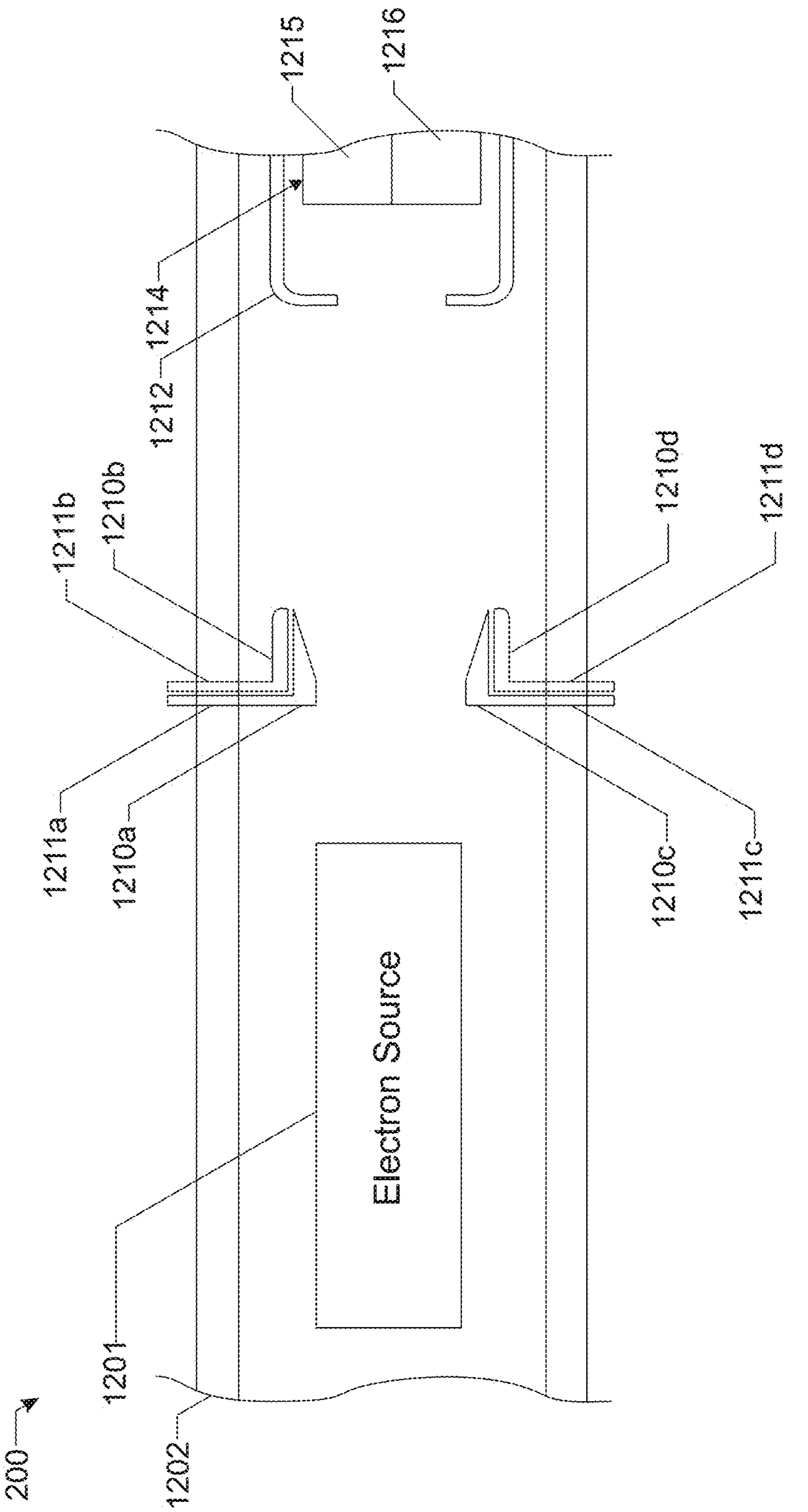
FIG. 11 is a schematic cross sectional view of a radiation generator in accordance with the present disclosure, wherein multiple axially collocated extractor electrodes are supported by radial feedthroughs in the housing.

The above examples were applications where the radiation generator is a neutron generator. Now examples where the radiation generator is an x-ray generator are described with reference to FIGS. 10-12. The x-ray generators 1100, 1200, 1300 are similar to the neutron generators 100, 200, 300 (from FIGS. 1, 2, 3, respectively) described above, except that instead of an ion source there is an electron source 1101, 1201, 1301. The electron source 1101, 1201, 1301 may include any number of active cathodes, such as ohmically heated cathodes, Spindt cathodes, and field emitter array cathodes.

In addition, there is no gas reservoir, and no ionizable gas within the envelope 1102, 1202, 1302. Indeed, there is instead a vacuum within the envelope 1102, 1202, 1302. Due to the aforementioned similarities, lengthy descriptions of the structure or operation of the x-ray generators 1100, 1200, 1300 need not be given, and all descriptions about the structure and independently selectable potentials of the extractor electrode segments 1110*a-d*, 1210*a-d*, 1310*a-d* from above apply. The x-ray generators 1100, 1200, 1300 operate by emitting electrons from the electron sources 1101, 1201, 1301 and accelerating them downstream toward the target 1114, 1214, 1314. When the electrons strike the target 1114, 1214, 1314, Bremsstrahlung x-rays are emitted.

It should be noted that the operating voltages of the various electrodes may be different than those used in the ion sources 100, 200, 300.

In addition, certain beam steering applications made possible by this disclosure may be of particular interest to x-ray generators, such as the application where there are different target portions 1115-1116, 1215-1216, 1315-1316 that could be longitudinally spaced apart, since there are no gas molecules in the x-ray generator 1100, 1200, 1300 to cause scattering of the electron beam, for example. This may be done to change the location of x-ray emission, as well as to allow the selection of emission of x-rays of different energies. The energy of emitted x-rays is based upon the potential drop between the extractor electrode segments 1110*a-d*, 1210*a-d*, 1310*a-d* and the target 1114, 1214, 1314; by having different target portions 1115-1116, 1215-1216, 1315-1316 at different potentials, different energies of x-rays can thus be emitted by selection of the appropriate target portion. The selection of emission of x-rays of different energies may be particularly useful in determining different formation properties, such as density, and probing different formation depths.

Figure 12:
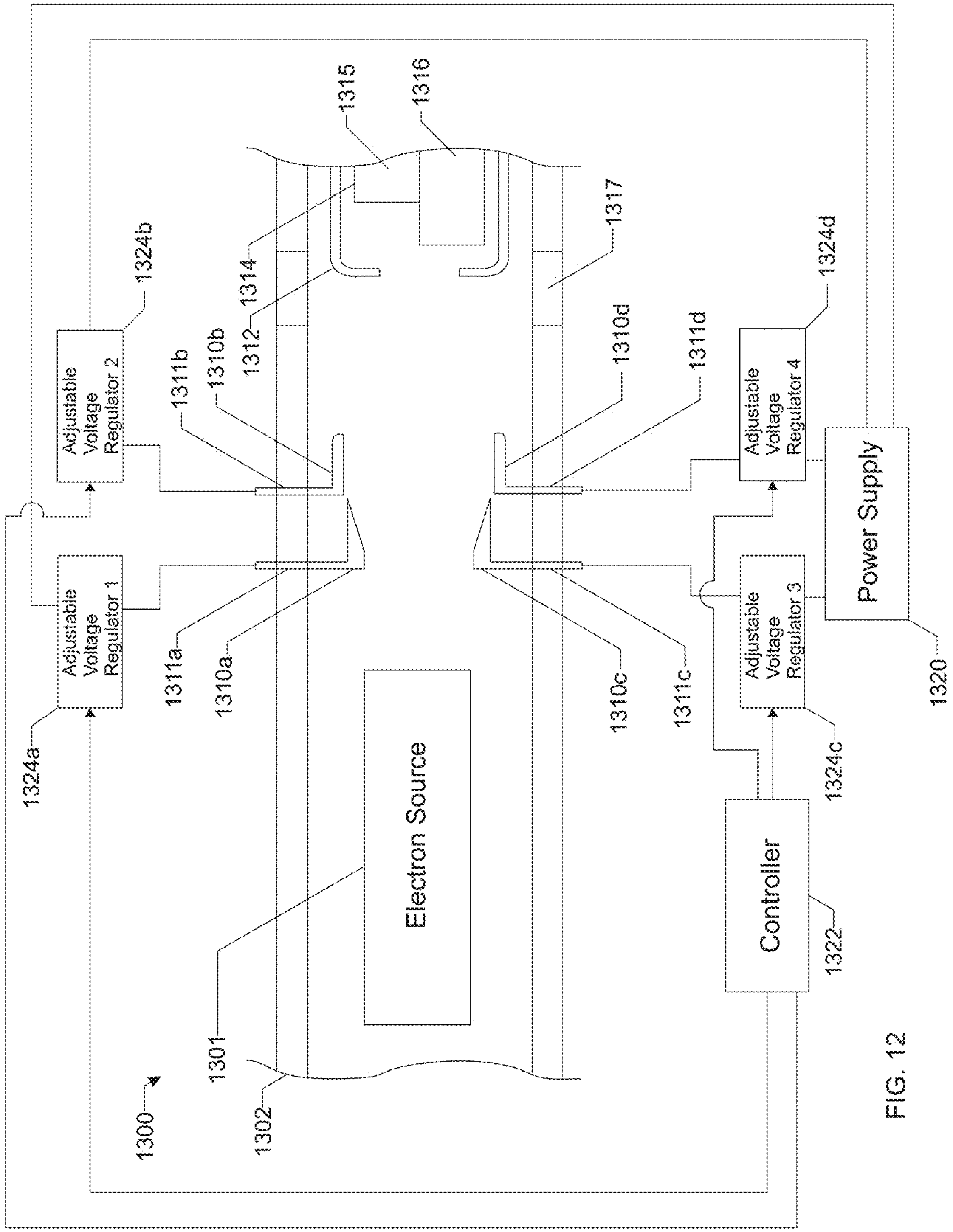
FIG. 12 is a schematic cross sectional view of a radiation generator in accordance with the present disclosure, wherein multiple axially spaced apart extractor electrodes are supported by radial feedthroughs in the housing, and wherein associated power and control circuitry is schematically shown.

In addition, the different target portions 1115-1116, 1215-1216, 1315-1316 can have different densities and/or thicknesses, such that x-rays generated within one target portion are able to escape from that target portion, while x-rays generated within another target portion are unable to escape from that target portion (in which case, the emitted x-rays are just those emitted from interactions between the electron beam and the surface of that target portion). This can be done to select emission of x-rays of different energies in some cases. In addition, the materials for those different target portions 1115-1116, 1215-1216, 1315-1316 can be selected such that a notch is created in the emitted x-ray spectrum, which may be useful for some measurements. In either case, there may be a window 1317 in the insulator 1302, to allow escape of some or all of the generated x-rays, as shown in FIG. 12. The material of the window 1317 may be selected such that x-rays of certain energies can pass through, while x-rays of other energies do not pass through, for example. This may also be useful for some measurements.

Figure 9:
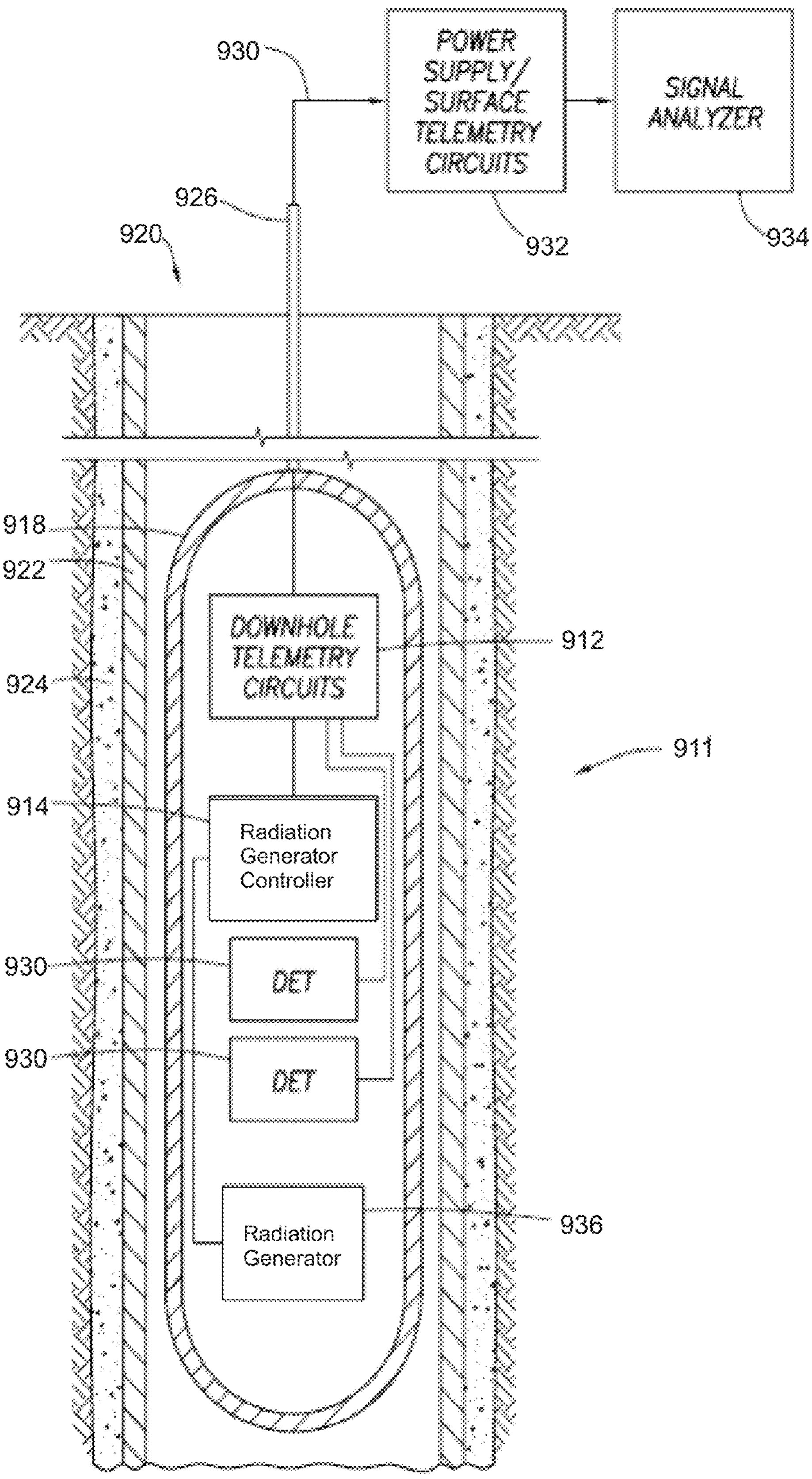
FIG. 9 is a schematic block diagram of a well logging instrument in which the radiation generator disclosed herein may be used.

Turning now to FIG. 9, an example embodiment of a well logging instrument 911 is now described. A pair of radiation detectors 930 are positioned within a sonde housing 918 along with a radiation generator 936 (e.g., as described above as radiation generator 100, 200, 300, 400, 500, 600, 700, 1100, 1200, 1300 in FIGS. 1-7, and 10-12) and associated high voltage electrical components (e.g., power supply). Although a pair of radiation detectors 930 are shown, it should be understood that there may be any number of radiation detectors, and that every radiation detector need not be of the same size, shape, area, or material. In addition, different radiation detectors 930 may be configured to detect different types of radiation, such as gamma rays, x-rays, and neutrons. The radiation detectors 930 may include scintillation crystals coupled to photomultipliers. Suitable scintillation crystals may include LaBr, YAP, LuAP, LuAG, NaI, GSO and others as known to those of skill in the art.

The radiation generator 936 may be a neutron generator, x-ray generator, or gamma ray generator. Supporting control circuitry 914 for the radiation generator 936 (e.g., low voltage control components) and other components, such as downhole telemetry circuitry 912, may also be carried in the sonde housing 918. The sonde housing 918 is to be moved through a borehole 920. In the illustrated example, the borehole 920 is lined with a steel casing 922 and a surrounding cement annulus 924, although the sonde housing 918 and radiation generator 936 may be used with other borehole configurations (e.g., open holes). By way of example, the sonde housing 918 may be suspended in the borehole 920 by a cable 926, although a coiled tubing, etc., may also be used. Furthermore, other modes of conveyance of the sonde housing 918 within the borehole 920 may be used, such as wireline, slickline, and logging while drilling (LWD), for example. The sonde housing 918 may also be deployed for extended or permanent surface or subsurface monitoring in some applications.

A multi-conductor power supply cable may be carried by the cable 926 to provide electrical power from the surface (from power supply circuitry 932) downhole to the sonde housing 918 and the electrical components therein (i.e., the downhole telemetry circuitry 912, low-voltage radiation generator support circuitry 914, and one or more of the above-described radiation detectors 930). However, in other configurations power may be supplied by batteries and/or a downhole power generator, for example.

The radiation generator 936 is operated to emit neutrons, x-rays, or gamma rays to irradiate the geological formation adjacent the sonde housing 918. Neutrons, gamma-rays, or x-rays that return from the formation are detected by the radiation detectors 930. The outputs of the radiation detectors 930 are communicated to the surface via the downhole telemetry circuitry 912 and the surface telemetry circuitry 932 and may be analyzed by a signal analyzer 934 to obtain information regarding the geological formation. By way of example, the signal analyzer 934 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 918 in some embodiments.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A radiation generator comprising:

at least three extractor electrodes;

an ion source upstream of the at least three extractor electrodes to emit ions in a downstream direction toward the at least three extractor electrodes;

a target downstream of the at least three extractor electrodes; and the at least three extractor electrodes having independently selectable potentials so as to allow direction of an ion beam, formed from the ions, by the independently selectable potentials, toward different longitudinal and lateral regions of the target, further comprising a controller coupled to the at least three extractor electrodes to direct the ion beam toward different areas of the target based upon an operating temperature of the radiation generator and/or a condition of the target.

2. The radiation generator of claim 1, wherein a plurality of the at least three extractor electrodes are axially collocated.

3. The radiation generator of claim 1, wherein a plurality of the at least three extractor electrodes are axially spaced apart.

4. The radiation generator of claim 1, wherein the target comprises a plurality of longitudinally spaced apart target regions; and wherein direction of the ion beam toward different longitudinal and lateral regions of the target includes directing the ion beam toward different toward different target regions of the plurality of longitudinally spaced apart target regions.

5. The radiation generator of claim 1, wherein the target comprises a plurality of different target areas each having a different coating thereon.

6. The radiation generator of claim 5, wherein a first target area of the plurality thereof has a first metal hydride coating thereon; and wherein a second target area of the plurality thereof has a second metal hydride coating thereon.

7. The radiation generator of claim 5, wherein a first target area of the plurality thereof has a titanium coating thereon.

8. The radiation generator of claim 5, wherein a second target area of the plurality thereof has a scandium coating thereon.

9. The radiation generator of claim 1, wherein the at least three extractor electrodes are mounted on respective different support structures.

10. The radiation generator of claim 9, wherein each support structure extends either radially toward its respective extractor electrode or axially toward its respective extractor electrode.

11. The radiation generator of claim 9, wherein the support structures are axially collocated.

12. The radiation generator of claim 9, wherein the support structures are axially spaced apart.

13. The radiation generator of claim 9, further comprising a vacuum envelope carrying the at least three extractor electrodes, the ion source, and the target; and further comprising respective different feedthroughs or conductive vias in the vacuum envelope coupled to the at least three extractor electrodes.

14. The radiation generator of claim 9, where each feedthrough or conductive via extends either radially into the vacuum envelope or axially into the vacuum envelope.

15. The radiation generator of claim 1, further comprising a controller coupled to the at least three extractor electrodes to direct the ion beam in a repetitive pattern toward different regions of the target so as to reduce heat load on the target.

16. The radiation generator of claim 1, wherein the ion source comprises an active cathode ion source, a penning type ion source, a RF ion source, or a microwave ion source.

17. A well logging tool for determining at least one property of a subsurface formation comprising:

a radiation generator comprising at least three extractor electrodes, an ion source upstream of the at least three extractor electrodes to emit ions in a downstream direction toward the at least three extractor electrodes, a target downstream of the at least three extractor electrodes, the at least three extractor electrodes having independently selectable potentials so as to allow changing a direction of an ion beam, formed from the ions by the independently selectable potentials, from a first longitudinal and lateral region of the target to a second longitudinal and lateral region of the target based upon an operating temperature of the radiation generator and/or a condition of the target, the target to emit outgoing radiation into the subsurface formation when struck by the ion beam;

at least one radiation detector to detect incoming radiation resulting from interactions between the outgoing radiation and the subsurface formation; and processing circuitry coupled to the at least one radiation detector to determine the at least one property of the subsurface formation based upon the detected incoming radiation.

18. The well logging tool of claim 17, wherein a plurality of the at least three extractor electrodes are axially collocated.

19. The well logging tool of claim 17, wherein a plurality of the at least three extractor electrodes are axially spaced apart.

20. The well logging tool of claim 17, wherein the target comprises a plurality of different target areas each having a different coating thereon.

21. The well logging tool of claim 17, wherein the at least one radiation detector comprises a scintillation crystal formed from $LaBr_3$, LuAG, LuAP, or YAP.

22. A method of operating a radiation generator comprising:

emitting ions from an ion source in a downstream direction toward at least three extractor electrodes; and varying potentials of the at least three extractor electrodes so as to direct an ion beam, formed from the ions by the selected potentials, toward different longitudinal and lateral regions of a target downstream of the at least three extractor electrodes, said different regions having different coatings thereon, based upon an operating temperature of the radiation generator and/or a condition of the target.

23. The method of claim 22, wherein the condition of the target comprises at least one of a temperature of the target, an amount of erosion and/or wear in the target, and a number of neutrons emitted from the target in a given period of time for a given reactant ion beam current.

* * * * *